US009478367B2

(12) United States Patent
Le Bihan et al.

(10) Patent No.: US 9,478,367 B2
(45) Date of Patent: Oct. 25, 2016

(54) POSITIONING SPACER, ENERGY STORAGE MODULE USING SAID SPACER AND METHOD FOR ASSEMBLING THE MODULE

(71) Applicant: Blue Solutions, Ergue Gaberic (FR)

(72) Inventors: Ludovic Le Bihan, Poullan-sur-Mer (FR); Laurent Le Gall, Ergue Gaberic (FR); Philippe Sagel, Edern (FR); Anne-Claire Juventin-Mathes, Quimper (FR)

(73) Assignee: Blue Solutions (FR)

( * ) Notice: Subject to any disclaimer, the term of this patent is extended or adjusted under 35 U.S.C. 154(b) by 149 days.

(21) Appl. No.: 14/376,012

(22) PCT Filed: Jan. 29, 2013

(86) PCT No.: PCT/EP2013/051661
§ 371 (c)(1),
(2) Date: Jul. 31, 2014

(87) PCT Pub. No.: WO2013/113691
PCT Pub. Date: Aug. 8, 2013

(65) Prior Publication Data
US 2015/0016023 A1    Jan. 15, 2015

(30) Foreign Application Priority Data

Feb. 3, 2012  (FR) .................................... 12 51018

(51) Int. Cl.
*H01G 2/02* (2006.01)
*H01G 11/52* (2013.01)
*H01G 2/10* (2006.01)
*B23P 19/00* (2006.01)
*H01G 11/10* (2013.01)
(Continued)

(52) U.S. Cl.
CPC ............... *H01G 11/52* (2013.01); *B23P 19/00* (2013.01); *H01G 2/02* (2013.01); *H01G 2/10* (2013.01); *H01G 2/106* (2013.01); *H01G 11/10* (2013.01); *H01G 11/78* (2013.01); *H01G 11/82* (2013.01); *Y10T 29/49826* (2015.01)

(58) Field of Classification Search
None
See application file for complete search history.

(56) References Cited

U.S. PATENT DOCUMENTS

| 8,795,869 B2* | 8/2014 | Caumont | H01G 2/04 429/120 |
| 2003/0133251 A1* | 7/2003 | Kitagawa | H01G 2/06 361/328 |
| 2006/0050468 A1* | 3/2006 | Inoue | H01G 2/04 361/328 |

(Continued)

FOREIGN PATENT DOCUMENTS

| DE | 102009040128 A1 | 3/2011 |
| EP | 1450422 A1 | 8/2004 |

OTHER PUBLICATIONS

International Search Report for Application No. PCT/EP2013/051661 Mar. 27, 2013.

*Primary Examiner* — Dion R Ferguson
(74) *Attorney, Agent, or Firm* — Lerner, David, Littenberg, Krumholz & Mentlik, LLP

(57) ABSTRACT

The invention concerns a positioning spacer for positioning electrical energy storage elements, such as supercapacitors or ultracapacitors connected in series, in an electrical energy storage module, wherein the spacer comprises a first support part and a second part forming a rim relative to the first part, the positioning spacer comprising, at the free end of the second part thereof, at least one housing recess, the spacer being made from an electrically insulating material.

22 Claims, 9 Drawing Sheets

(51) Int. Cl.
*H01G 11/78* (2013.01)
*H01G 11/82* (2013.01)

(56) References Cited

U.S. PATENT DOCUMENTS

| | | | | |
|---|---|---|---|---|
| 2006/0061937 A1* | 3/2006 | Takemoto | ............ | B60R 16/023 361/328 |
| 2007/0008676 A1* | 1/2007 | Goesmann | ............... | H01G 4/38 361/328 |
| 2007/0195485 A1* | 8/2007 | Erhardt | .................... | H01G 9/06 361/328 |
| 2007/0253146 A1* | 11/2007 | Inoue | ...................... | H01G 2/04 361/328 |
| 2009/0059470 A1* | 3/2009 | Morita | ..................... | H01G 2/06 361/308.3 |
| 2010/0053927 A1* | 3/2010 | Inoue | ...................... | H01G 2/04 361/830 |
| 2010/0134940 A1 | 6/2010 | Nguyen et al. | | |
| 2012/0077356 A1* | 3/2012 | Shimizu | .................. | H01G 2/06 439/55 |

* cited by examiner

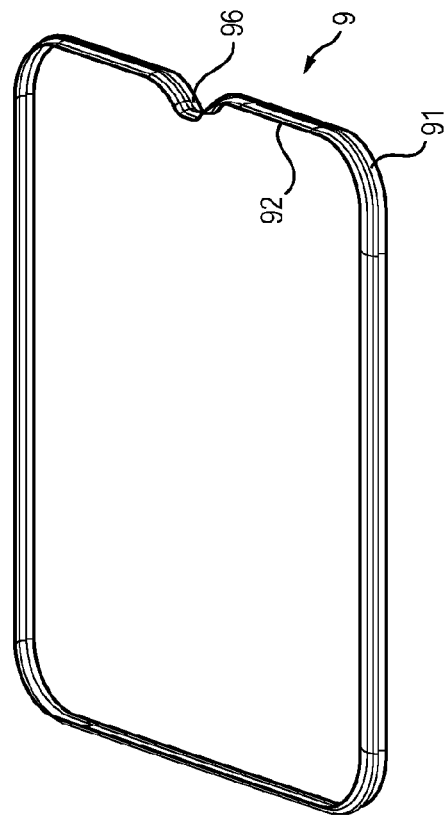
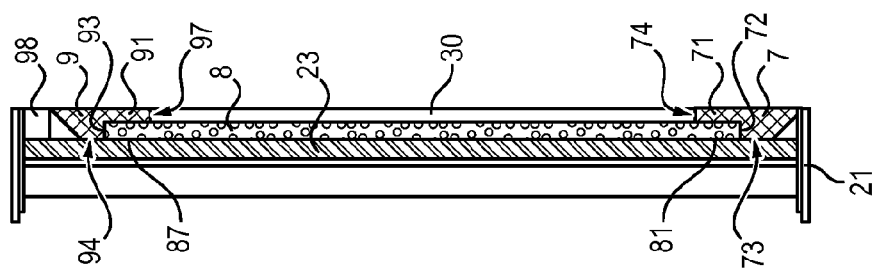
FIG. 4
FIG. 3

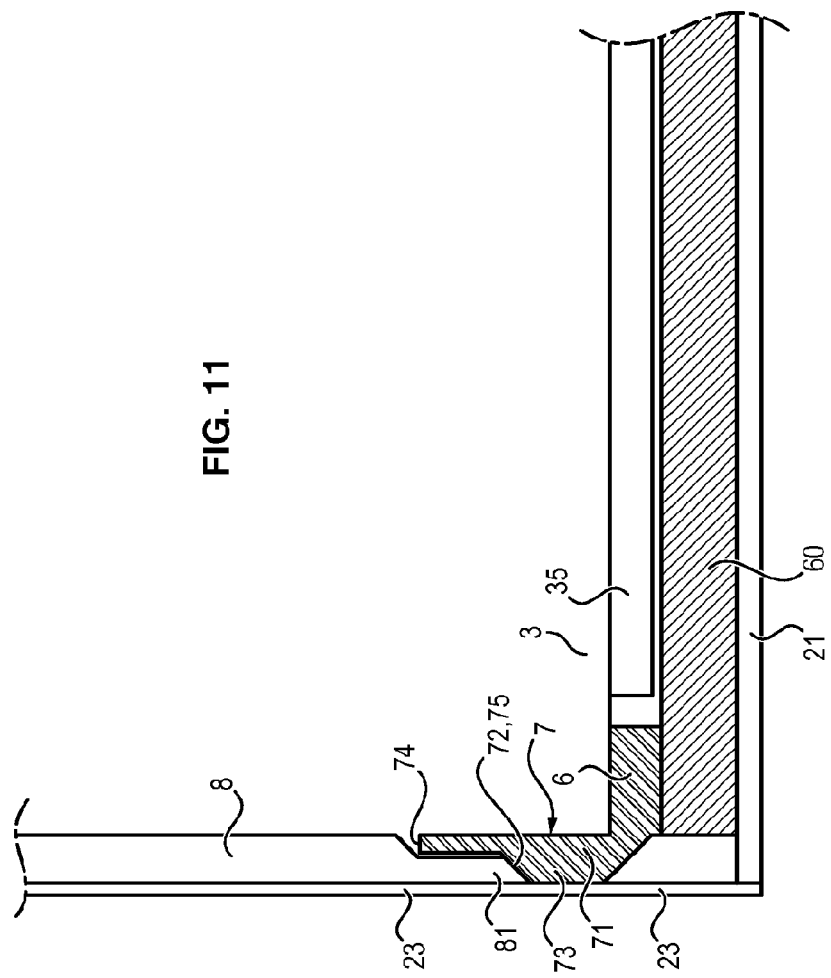

POSITIONING SPACER, ENERGY STORAGE MODULE USING SAID SPACER AND METHOD FOR ASSEMBLING THE MODULE

CROSS REFERENCE TO RELATED APPLICATIONS

The present application is a national phase entry under 35 U.S.C. §371 of International Application No. PCT/EP2013/051661, filed Jan. 29, 2013, published in French, which claims priority from French Patent Application No. 1251018, filed Feb. 3, 2012, the disclosures of which are incorporated by reference herein.

The invention relates to a positioning spacer for positioning electrical energy-storage elements in an energy storage module.

These electrical energy-storage elements are for example ultracapacitors, or supercapacitors, each having considerable farad capacity, typically greater than 1 farad for each element.

In the prior art, the energy storage module usually comprises several energy-storage elements (supercapacitors) connected in series and placed in a case composed of a rigid mechanical envelope made of metallic material, comprising many conductors connected to the different elements and a balancing electronic card. Many parameters must be optimised on these modules which must ideally have minimal weight, be electrically insulating, support substantial mechanical stresses and also evacuate heat.

Modules are disclosed for example in documents FR-A-2 916 306 and FR-A-2 915 626.

One of the performance axes of energy-storage systems is the energy density by volume (in W·h/l) or by weight (W·h/kg). Systems must therefore be the lightest and the most confinest as possible.

However, these systems can reach levels of voltage or undergo very high levels of overvoltage. It is therefore necessary to insulate networks (high voltage/low voltage) from each other.

Also, energy-storage elements generate heat when operating. This heat must be evacuated for optimal operation of the system. The energy storage can be a source of fire or favour the spread of an existing fire. Ideally, materials employed for the modulizing of energy-storage elements must be able to respond to high demands of fire resistance.

The energy-storage element needs no particular use position. Its modulizing must therefore not be restrictive, in the sense that it must allow use of the system in different positions with the same level of performance.

Finally, for easier industrialisation of these systems, a reduction in the number of pieces is preferred, simplification of assembly operations, a drop in costs of elements, therefore designs absorbing a certain level of geometric imperfections of the elements without this altering performances of the final product (robustness of design), and a product quality which is not "operator-dependent".

The problems mentioned hereinabove are relative to the general problem of energy storage.

The aim more particularly is to concentrate on a module all electrical and thermal performances while ensuring constraint of fire resistance and use in multiple positions. Therefore, the module must be able to be used when it is placed on one of its lateral faces.

In the modules of the prior art indicated hereinabove, the design of the module lacks robustness in the zones where the insulating pieces are joined. In fact, electrical insulation of the module needs the presence of many lining pieces and the assembly operation of these pieces is a delicate operation which, if badly done, creates a gap or interstice at the junction of these pieces, which places at an insufficient distance the active parts under tension (wall of the module covered in elastomer material) relative to the parts to ground (walls of the module covered in foam) and increases the risk of short-circuit.

The invention aims to provide a positioning spacer, an energy storage module and a method of assembly of a module, which eliminate the disadvantages of the prior art.

For this purpose, a first aim of the invention is a positioning spacer for positioning electrical energy-storage elements in an electrical energy storage module, characterized in that the spacer comprises a first support part and a second part forming a rim relative to the first part, the positioning spacer comprising at the free end of its second part at least one housing recess, the spacer being made of electrically insulating material.

According to an embodiment of the invention, the spacer is preferably configured so that the first and the second parts can form a non-zero angle, especially be substantially perpendicular. According to an embodiment of the invention, the spacer can especially be conformed so that the first and second parts form a non-zero angle together or comprise a deformation zone (such as a folding zone, for example a thinned zone) at the interface of these two parts (the first and second parts are in the same plane during manufacture of the spacer but the spacer is deformed during its installation in the module).

According to an embodiment, the second part is connected to the first part.

According to an embodiment, the second part is monobloc with the first part.

A second object of the invention is an energy storage module, comprising an outer case having outer walls, comprising at least one first wall and at least one second wall adjacent to the first wall, the walls delimiting an inner space housing electrical energy-storage elements, characterized in that the module comprises at least one positioning spacer such as described hereinabove for positioning at least some of the electrical energy-storage elements relative to the first wall and relative to the adjacent second wall, the first part of the spacer being intended to ensure positioning relative to the at least one first wall and the second part of the spacer being intended to ensure positioning relative to the at least one second wall.

According to an embodiment of the invention, the at least one second wall is generally substantially perpendicular to the first wall.

According to an embodiment of the invention, the first part is especially intended to be supported (able to be directly or with interposition of another piece) against the first wall, whereas the second part is intended to be supported against the second wall.

A third object of the invention is a method of assembly of a module such as described hereinabove, comprising the following steps:

a set comprising the electrical energy-storage elements and the at least one spacer is formed such that the first part of each spacer is placed on or under the elements and the second part of the spacer extends laterally outside the set according to a plane comprising a parallel to the longitudinal direction of the storage elements, the set is surrounded by a lining band constituting a second lining piece such that the edge of the band is placed in the recess of the second part of the spacer, and the band is fixed to the elements, at least the second walls of the case are connected on the elements such that the walls are in contact with the lining band.

The invention will be better understood from the following description, given solely by way of non-limiting example in reference to the attached drawings, wherein:

FIG. 3 is a schematic view in section of an outer part of the module according to an embodiment of the invention in the final assembly state of the module;

FIG. 4 is a schematic view in perspective of a ring present in the module according to an embodiment of the invention;

FIG. 11 is a schematic view in section of a part of the module according to another embodiment of the invention in the assembly state of the module.

Figure 1:
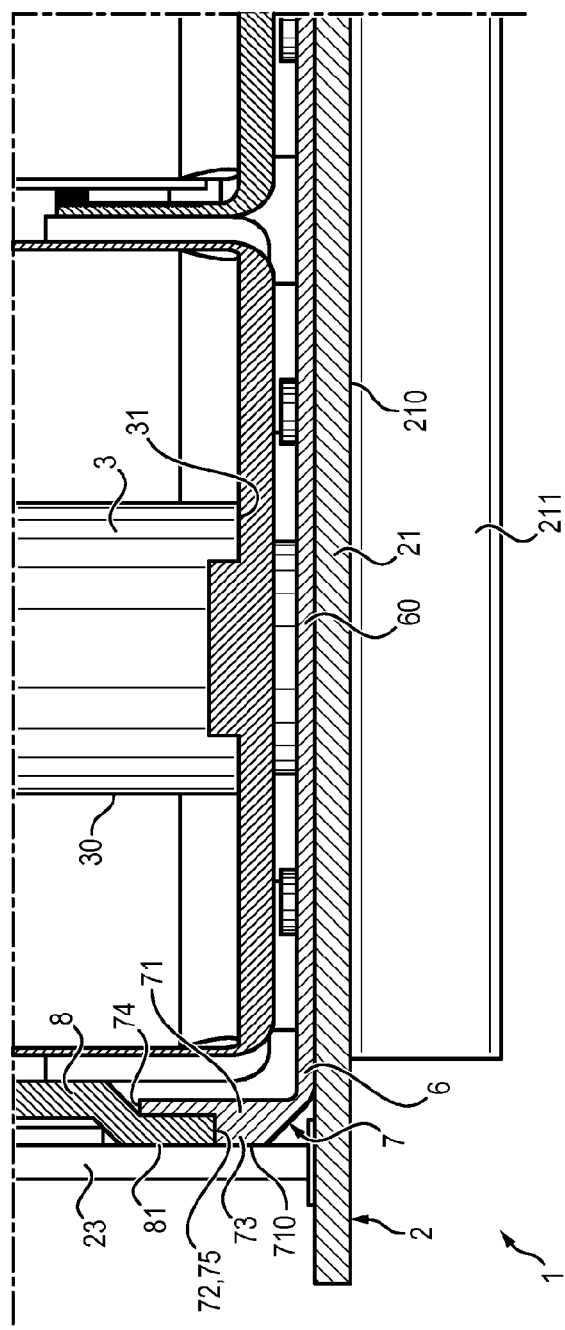
FIG. 1 is a schematic view in section of a part of the module according to an embodiment of the invention in the final assembly state of the module.

In FIGS. 1 to 11, a positioning spacer (7) and/or (9) is provided for positioning electrical energy-storage elements in an electrical energy storage module. The spacer comprises a first support part (6; 92) and a second part (71, 91) forming a rim (71, 91) relative to the first part (6; 92). The positioning spacer (7) comprises at the free end of its second part (71, 91) at least one housing recess (72, 93), the spacer being made of electrically insulating material.

The embodiments hereinbelow are described in reference to FIGS. 1 to 11.

According to an embodiment of the invention, the spacer (7) and/or (9) constitutes a closed spacing ring (7, 9).

According to an embodiment of the invention, the first part is a substantially plane layer (60; 92) of material delimited by an outer contour, the outer contour being bordered at least partially by the second part (71, 91).

According to an embodiment of the invention, the second part (71, 91) comprises several portions not connected to each other.

According to an embodiment of the invention, in the event where the first part is a layer (60) delimited by an outer contour, the second part is conformed such that the portion or the portions constituting it border the entire contour of the first part to ensure better insulation. According to an embodiment of the invention, the second part (71, 91) is substantially perpendicular to the first part (6; 92).

According to an embodiment of the invention, the first part of the spacer comprises at least one pin (602) for keeping the elements at a distance from each other, which electrically insulates the different elements relative to each other.

According to an embodiment of the invention, an energy-storage module (1) comprises an outer case (2) having outer walls (21, 22, 23, 24, 25, 26), comprising at least one first wall (21, 22) and at least one second wall (23, 24, 25) adjacent to the first wall (21, 22), the walls (21, 22, 23, 24, 25, 26) delimiting an inner space housing electrical energy-storage elements (3), characterized in that the module comprises at least one positioning spacer (7; 9) such as described hereinabove for positioning at least some of the electrical energy-storage elements (3) relative to the first wall (21, 22) and relative to the adjacent second wall (23, 24, 25), the first part (6; 92) of the spacer being intended to ensure positioning relative to the at least one first wall (21, 22) and the second part (71, 91) of the spacer being intended to ensure positioning relative to the at least one second wall (23, 24, 25).

According to an embodiment of the invention, the at least one second wall (23, 24, 25) adjacent to the first wall (21, 22) is substantially perpendicular to the first wall.

According to an embodiment of the invention, the first part (6; 92) of the spacer is supported against the at least one first wall (21, 22).

According to an embodiment of the invention, the second part (71, 91) of the spacer is supported against the at least one second wall (23, 24, 25).

According to an embodiment of the invention, the module comprises a first lining piece (60) made of electrically insulating material, intended to cover at least partially the first wall (21) of the module to be located between the first wall (21) and the electrical energy-storage elements (3).

According to an embodiment of the invention, the first lining piece (6) is a thermal dissipation and electrical insulation piece (60), made of thermally conductive material and extending substantially parallel to the first wall (21), to dissipate towards this first wall (21) heat released by the electrical energy-storage elements (3). Alternatively, according to an embodiment of the invention, the positioning spacer can also be connected to the lining piece in the module according to the invention (by compression, once the module is in the final state, by clipping, etc).

According to an embodiment of the invention, the thermal dissipation and electrical insulation piece (60) is constituted by the first part (6) of the at least one spacer (7).

According to an embodiment of the invention, the rim (71) borders at least one part of the contour of the piece (60).

According to an embodiment of the invention, the module comprises at least one second lining piece (8) made of electrically insulating material, intended to cover at least partially the at least one second wall (23, 24, 25) of the module to be located between said second wall (23, 24, 25) and the electrical energy-storage elements (3), the recess (72, 93) of the at least one spacer serving to house an edge (81, 87) of the second lining piece (8).

According to an embodiment of the invention, the second lining piece (8) is made of compressible material at least in its edge (81, 87) housed in the recess (72, 93) to ensure that the lining piece is held relative to the spacer.

According to an embodiment of the invention, the recess can be configured such that the limit of compressibility of the compressible material for preserving the insulation properties over time is not exceeded. According to an embodiment of the invention, the thickness of the recess (according to the normal direction to the second) is selected between 1 and 4 mm, especially 2 and 3 mm. According to an embodiment of the invention, the recess can extend over the entire length of the second part or only part thereof.

According to an embodiment of the invention, the at least one second lining piece (8) is constituted by a band wound around all the electrical energy-storage elements (3) and fixed to these electrical energy-storage elements (3), especially by means of adhesive.

According to an embodiment of the invention, the positioning spacer comprises at least one stop (75) delimiting an end of the housing recess (72, 93) and located at a distance from the free end of the second part (71; 91). This stop is especially perpendicular to the second wall. Because of such a stop, high-performing electrical insulation and simple mounting can be ensured. In fact, keeping the lining pieces in position is effectively ensured and placing of the second lining piece on the module is simplified since it is easier by means of the stop for the operator to position the second lining piece (foam) without leaving a gap at the junction of the walls of the case.

According to an embodiment of the invention, the stop can be constituted by a wall extending over all or part of the dimension of the recess or can comprise a plurality of stop walls distributed over the entire dimension of the recess. According to an embodiment of the invention, these stop walls are in the same plane and separated by gaps.

According to an embodiment of the invention, the spacer constitutes a closed spacing ring (7, 9), the ring (7, 9) forming this spacer being dimensioned to surround a plurality of juxtaposed electrical energy-storage elements (3).

According to an embodiment of the invention, at the interface between two adjacent determined elements (7, 9), the ring (7, 9) comprises at least one lip (96) configured to locally spread the spacer relative to the second wall (23, 24, 25) and follow the contour of the two determined adjacent elements. Therefore, the spacing ring remains attached to the elements, which makes it easier to put in place and avoids contact of the elements with the wall of the case.

According to an embodiment of the invention, the outer case (2) has the general form of a parallelepiped, comprising two first faces (21, 22) constituting the faces of largest area of the case (2), adjacent to four other faces (23, 24, 25, 26) of the parallelepiped, designated second faces, at least one first spacer (7) is provided as spacer, whereof the first part (6) is supported against one of the two first faces (21, 22) forming the first wall (21, 22) and whereof the second part is supported against at least one of the second faces (23, 24, 25) forming the at least one second wall (23, 24, 25).

According to an embodiment of the invention, at least one second spacer (9) is provided as spacer whereof the first part (92) is supported against the other first face (22) forming another first wall (22) of the case (2) and whereof the second part (91) is supported against at least one of the second faces (23, 24, 25) forming the at least one second wall (23, 24, 25).

According to an embodiment of the invention, the module comprises:

the sole first spacer (7) whereof the first part (6) is constituted by a first lining piece (60) made of electrically insulating material, intended to cover at least partially the first wall (21) of the module to be located between the first wall (21) and the electrical energy-storage elements (3), the first lining piece (60) being a thermal dissipation and electrical insulation piece (60), made of thermally conductive material and extending substantially parallel to the first wall (21), to dissipate towards this first wall (21) heat released by the electrical energy-storage elements (3), and the sole second spacer (9), forming a spacing ring.

According to an embodiment of the invention, the module comprises at least one mechanical reinforcement (212) passing through the case to connect two opposite walls of the module, especially for example the two walls of largest area.

In this case, according to one embodiment of the invention, the spacer (7; 9) can comprise at least one opening (603) intended to receive the mechanical reinforcement and a cylinder (604) delimiting the contour of the opening, especially for example in its first part (71; 91). This avoids current leaks at the level of the mechanical reinforcements.

According to an embodiment of the invention, the positioning spacer, and optionally the dissipation piece, is made of elastomer material, for example EPDM (ethylene-propylene-diene monomer).

According to an embodiment of the invention, the outer face (210) of the first wall is in contact with at least one supplementary heat dissipation piece (211).

According to an embodiment of the invention, the module comprises electrical terminals (4, 5) accessible from the outside, electrical connection means (35) being provided to form between these electrical terminals (4, 5) an electrical circuit with the electrical energy-storage elements (3).

According to an embodiment of the invention, a method of assembly of the module such as described hereinabove is provided, comprising the following steps:

a set comprising the electrical energy-storage elements (3) and the at least one spacer is formed such that the first part (6, 92) of each spacer is placed on or under the elements (3) and the second part (71, 91) of the spacer (7, 9) extends laterally outside the set according to a plane comprising a parallel to the longitudinal direction (L) of the storage elements (3), the set is wrapped with a lining band (8) constituting a second lining piece (8) such that the edge (81) of the band (8) is placed in the recess (72, 93) of the second part (71, 91) of the spacer (7, 9), and the band is fixed to the elements (3), at least the second walls (23-26) of the case (2) are assembled on the elements (3) such that the walls are in contact with the lining band (8).

According to an embodiment of the invention, the band is fixed to the elements (3), for example by means of adhesive.

According to an embodiment of the invention, the lining band (especially foam) can be placed as a stop against a positioning stop (75) of the spacer.

According to an embodiment of the invention, if the first part of the spacer (7) is a layer (60), the elements (3) are placed on this layer (60).

According to an embodiment of the invention, if the spacer forms a spacing ring (9), the elements (3) are surrounded by the spacer (9).

According to an embodiment of the invention, a spacer (7, 9) can also be put in place at each end (31, 32) of the elements (3).

According to an embodiment, the second part (71, 91) is connected to the first part (6, 92).

According to an embodiment, the second part (71, 91) is monobloc with the first part (6, 92).

According to an embodiment of the invention, an energy-storage module is provided, comprising an outer case (2) having outer walls (21, 22, 23, 24, 25, 26), comprising a first wall (21) and at least one second wall (23, 24, 25) adjacent to the first wall (21), the walls (21, 22, 23, 24, 25, 26) delimiting an inner space housing electrical energy-storage elements (3), a module wherein at least one first thermal dissipation and electrical insulation piece (60), extending substantially parallel to the first wall (21) is interposed between the first wall (21) and the electrical energy-storage elements (3) to dissipate towards this first wall (21) heat released by the electrical energy-storage elements (3), characterized in that a positioning spacer (7) comprising a contact rim (71) against a part of the second wall (23, 24, 25), which rim (71) extends protruding transversally relative to the first thermal dissipation and electrical insulation piece (60), is positioned such that the rim (71) borders at least one part of the contour of the first thermal and electrical insulation dissipation piece (60), the positioning spacer (7) being made of electrically insulating material.

According to an embodiment of the invention, the spacer is fixed to at least one part of the contour of the first thermal dissipation piece (60).

According to an embodiment of the invention, the module comprises electrical terminals (4, 5) accessible from the outside, electrical connection means (35) being provided to form between these electrical terminals (4, 5) an electrical circuit with the electrical energy-storage elements (3).

According to an embodiment of the invention, the positioning spacer (7) and the first thermal dissipation piece (60) are monobloc of said material insulating electricity.

According to an embodiment of the invention, the positioning spacer (7) is a piece separate from the first thermal dissipation piece (60) by being superposed, for example attached to, on the latter.

According to an embodiment of the invention, the positioning spacer (7) is fixed to the entire contour of the first piece (60).

According to an embodiment of the invention, the positioning spacer (7) is fixed to a part of the contour of the first thermal dissipation piece (6) opposite three lateral second walls adjacent (23, 24, 25) to each other.

According to an embodiment of the invention, the positioning spacer (7) comprises on its rim (71) at least one recess (72) serving to house an edge (81) of a second lining piece (8) made of electrically insulating material, located between the second wall (23, 24, 25) and the elements (3).

According to an embodiment of the invention, the recess (81) is turned towards the second wall (23, 24, 25).

According to an embodiment of the invention, the recess (81) is delimited by a part located to the rear relative to the outer side (710) of the rim (71) serving as contact with the second wall (23, 24, 25), to house the edge (81) of the second lining piece (8) between the second wall (23, 24, 25) and this part.

According to an embodiment of the invention, the module comprises a spacing ring (9) in common between several of the walls (23, 24, 25) and those of the elements (3) located opposite these walls (23, 24, 25), this ring (9) being supported on a zone of several of these elements (3), distant from the positioning spacer (7), and being peripheral to these elements (3).

According to an embodiment of the invention, the spacing ring (9) is located in common against said zone of said elements (3), comprising the part of their proximal ridge relative to said walls (23, 24, 25).

According to an embodiment of the invention, the spacing ring (9) comprises two adjacent support rims (91, 92) against two adjacent sides located in said zone of said elements (3), the adjacent rims (91, 92) and the adjacent sides forming a non-zero angle between them.

In the figures, a first wall 21 and at least one second wall 23, 24, 26 adjacent to this first wall 21 are provided as outer walls. Once the outer case 2 has been assembled, in the embodiment shown in FIG. 2, it has for example the general form of a parallelepiped, with a first wall 21, which is a first of the two walls of larger area of the parallelepiped, and four second walls 23, 24, 25, 26 formed by the four other walls of the parallelepiped, which are adjacent to this first wall 21 and which are adjacent to each other, the wall 22 being the other wall of largest area, opposite the wall 21 and adjacent to the walls 23, 24, 25, 26 in the final assembly state of the module 1 (the wall 22 is shown separate from the other walls 21, 23, 24, 25 and 26 in FIG. 2 but is of course fixed to the latter in the final assembly state). In the following, the first wall 21 is called lower wall 21, the wall 22 is called upper wall, and the walls 23, 24, 25, 26 are called lateral walls. But, of course, the module 1 can be arranged with any walls 21, 22, 23, 24, 25, 26 arranged below in the final assembly state.

The case 2 comprises electrical terminals 4, 5 accessible from the outside. Electrical connection means are provided to form between the terminals 4, 5 an electrical circuit with the electrical energy-storage elements 3. The walls 21, 22, 23, 24, 25, 26 conduct electricity and for example are metal. These walls 21, 22, 23, 24, 25, 26 are for example intended to be put at the same electrical potential, for example at an electrical earth. Insulating members are for example provided around the terminals 4 and 5 for insulating these terminals 4, 5 from the lateral wall 26 which they pass through, the wall 26 having two holes 41, 51 for passage of the terminals 4, 5 and these insulating members. The terminals 4, 5 are accessible from the outside of the case 2 to allow them to be connected electrically to an outer circuit.

The electrical energy-storage elements 3 are for example ultracapacitors, each having an individual capacity of a value greater than or equal to 1 Farad. The module 1 is capable of being charged and discharged with electrical energy via the terminals 4, 5. Of course, the module 1 can comprise other electrical terminals accessible from the outside for its charge and/or its discharge, and/or other communication access with the outside and/or control via the outside and/or monitoring of parameters from the outside.

These electrical energy-storage elements 3 are for example connected in series by the connection means. Each electrical energy-storage element 3 has for example two electrical connection terminals. Each element 3 has for example a first lower face 31 turned towards the first wall 21 and another face 32 turned away from this first face 31 and turned towards the wall 22. A first of the connection terminals of the electrical energy-storage element 3 is for example located on its first face 31, whereas the second of the connection terminals of the electrical energy-storage element 3 is for example located on its second face 32. In the figures, each element 3 has a general circular cylindrical form between its faces 31 and 32. The elements 3 are arranged side by side in the case 2. The axes of revolution of the elements 3 are for example substantially parallel. In other variants not shown, the electrical energy-storage elements can be in another form, for example parallelepipedic, square, oval, hexagonal or other.

In the embodiment shown in the figures, the electrical energy-storage elements 3 are arranged such that their axes of revolution are perpendicular to the lower and upper walls 21, 22 of the case 2.

The connection means are for example formed by metallic connection links 35 conducting electricity, connecting the faces 31 in pairs and by other links 35 connecting the faces 32 of the elements 3 in pairs. The links are generally welded on to the faces of the elements 3.

An embodiment shown in FIGS. 1 to 10 is described hereinbelow, wherein the first part 6 of the first positioning spacer 7 is a first lining piece 60 formed by a first thermal dissipation and electrical insulation piece 60 interposed between the first wall 21 and the energy-storage elements 3.

Figure 2:
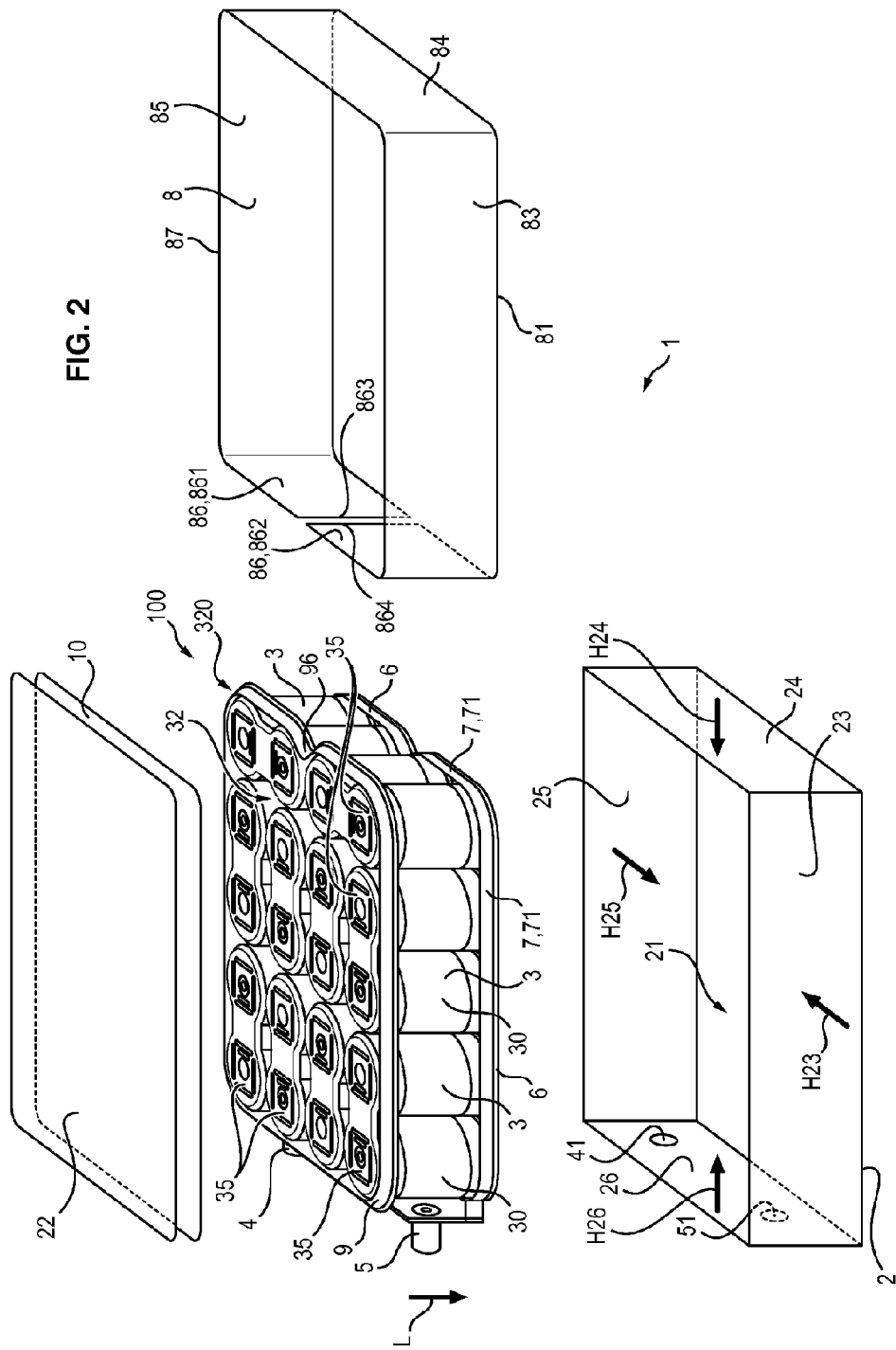
FIG. 2 is a schematic exploded view in perspective of the module according to an embodiment of the invention in the final assembly state of the module.

In fact, the electrical energy-storage elements 3 preferably conduct heat according to their axis of revolution, parallel to the longitudinal direction L shown in FIG. 2, such that axial cooling of the electrical energy-storage elements 3 is more efficacious than cooling transversal to this direction L. The thermal contacting of the electrical energy-storage elements 3 with the first wall 21 improves cooling of the electrical energy-storage elements 3 by an increase in the heat exchange surface between the elements 3 and the outside of the module 1.

The first thermal dissipation and electrical insulation piece 60 is made of electrically insulating material and conducts heat.

The first thermal dissipation and electrical insulation piece 60 extends substantially parallel to the first wall 21 to dissipate the heat released by the elements towards this first wall 21.

In the final assembly state, when the assembled sub-set 100, comprising the electrical energy-storage elements 3 and the first piece 60, is in the case 2, the first thermal dissipation and electrical insulation piece 60 is in contact with energy-storage elements 3 and is also in contact with the first wall 21 to dissipate the heat released by the energy-storage elements 3 towards this first wall 21.

According to an embodiment, the first thermal dissipation and electrical insulation piece 60 comprises for example a layer 60 extending between the elements 3 and the first wall 21 and extending at least opposite the elements 3.

According to an embodiment, the outer face 210 of the first wall 21 is in contact with at least one supplementary heat dissipation piece 211. According to an embodiment, the supplementary heat dissipation piece 211 comprises for example fins or more generally a device for increasing the contact surface with the atmosphere relative to the surface of the face 21, to dissipate the heat towards the outside.

The first thermal dissipation and electrical insulation piece 60 is for example made of deformable material. The first thermal dissipation and electrical insulation piece 60 is for example made of elastomer material, such as for example EPDM (ethylene-propylene-diene monomer), and for example has resistivity greater than $10^{12}$ ohm·cm and for example preferably greater than $10^{14}$ ohm·cm.

The second part of the first positioning spacer 7 comprises a contact rim 71 against a part of the second wall 23, 24, 25. The rim 71 extends protruding transversally relative to the first thermal dissipation and electrical insulation piece 60. In this embodiment, the positioning spacer 7 is in a single piece with at least one part of the contour of the first thermal dissipation and electrical insulation piece 60. The positioning spacer 7 is made of electrically insulating material, especially, in the present case, the same material as that of the dissipation piece. The rim 71 extends therefore transversally relative to the first wall 21 and parallel relative to the second wall 23, 24, 25. The rim 71 extends transversally relative to the plane general wherein the first thermal dissipation and electrical insulation piece 60 extends. The rim 71 is for example perpendicular to the first thermal dissipation and electrical insulation piece 60. The rim 71 is for example perpendicular to the first wall 21. Of course, the rim 71 could also extends in oblique relative to the first thermal dissipation and electrical insulation piece 60 and/or relative to the first wall 21. The rim 71 extends therefore transversally relative to the first wall 21. In the embodiment of FIG. 2, the rim 71 protrudes upwards above the first lower wall 21. In the embodiment of FIG. 2, the rim 71 protrudes upwards in the direction of the upper wall 22.

In other embodiments, such as for example that shown in FIG. 11, the positioning spacer 7 can be a piece separate from the first thermal dissipation piece 60. In an embodiment, the positioning spacer 7 is placed on the first thermal dissipation piece 60 such that the rim 71 is positioned to protrude transversally from the dissipation piece 60. It can be placed simply on the piece and kept in place by compression once the module is in the final or fixed state on the dissipation piece, for example by clipping or other on a part of the contour of the first piece or on the whole contour of the first piece.

According to another embodiment of the invention, shown in FIG. 11, the first part (6) of the spacer (7) is supported against the first wall (21) with interposition of the first lining piece (60).

In the embodiments shown in FIGS. 1 to 10, the first positioning spacer 7 is fixed to the whole of the contour of the first piece 60. The positioning spacer 7 comprises for example a contact rim 71 against each of the four second walls 23, 24, 25, 26, the rim being in a single piece.

Consequently, when the first piece 60 with the elements 3 above is in the case 2 in its final assembly state, as shown by the walls 21, 23, 24, 25, 26 in FIG. 2, the positioning spacer 7 is applied by its rim 71 against the second walls 23, 24, 25 and/or 26, as is shown by way of example for the wall 23 in FIG. 1, to ensure electrical insulation at the level of the junction between this second wall 23, 24, 25, 26 and the adjacent first wall 21. This spacer 7 guarantees that there will be no insulation gap in the inner corners and the inner ridges of the case (between the first wall 21 and the second wall 23, 24, 25, 26).

In another embodiment, the positioning spacer 7 could be fixed to a part of the contour of the first thermal dissipation piece 60, for example opposite two or three second lateral walls 23, 24, 25 adjacent to each other. It could also comprise a plurality of rims in a single piece with the dissipation piece but independent of each other.

Consequently, in an embodiment shown in FIGS. 1, 2, 10 and 11, the outer case has the general form of a parallelepiped, the first wall 21 is a first of the two faces of largest area of the parallelepiped, adjacent to four other second faces of the parallelepiped, including the second wall or second walls 23, 24, 25, the positioning spacer 7 comprising the contact rim 71 against a part of each of the second wall or second walls 23, 24, 25, 26.

In the embodiments shown in figures, the positioning spacer 7 comprises on its rim 71 at least one projection 73 in the direction of the wall 23 of the case. In the embodiments shown, the at least one projection 73 extends parallel to the first wall 21 in the direction of the wall 23 of the case. The projection 73 of the rim 71 has a thickness greater than the rest of the rim 71. This thickness is taken according to the direction normal to the second wall. The projection is placed on the face of the spacer turned towards the corresponding second wall 23, 24, 25, 26. This projection 73 is located at a distance from the free end 74 of the rim 71 such that the rim 71 has in the vicinity of the free end 74 a recess 72 serving to house an edge 81 of a second lining piece 8 made of electrically insulating material. This lining piece 8 is located between the second wall 23, 24, 25, 26 and the elements 3. In the embodiment shown in FIGS. 1 and 3, this recess 72 is turned towards the corresponding second wall 23, 24, 25, 26, that is towards the outside. A face 75 of the projection 73 essentially parallel to the wall 21 serves as positioning stop of the lining piece 8. In the embodiment shown in FIG. 7, the projection 73 extends continuously over the entire length of the rim 71 along the faces 23, 24, 25. Alternatively, the rim 71 could comprise a plurality of projections 73 distributed evenly over its entire length, the stop being formed by the plurality of the upper walls of the projections 73 (located in the same plane), distributed along the rim 71 and separated from each other by empty spaces.

In an embodiment, the second lining piece 8 is made of compressible material at least on its edge 81 housed in the recess 72 to ensure it is kept in position of the edge 81 of the second lining piece 8 in this recess 72. Compression of the edge 81 of the second lining piece 8 in the recess 72 ensures the lining piece 8 is kept in position by being wedged in to the recess 72. Consequently, as is evident in FIG. 1, the edge 81 of the second lining piece 8 is between the second wall and the free end 74 to be compressed in the recess 72. As a variant, the lining piece 8 could be superposed on the rim 71 such that the projection 73 becomes embedded in the piece 8, being held in place by compression.

The second lining piece 8 is made of synthetic material, for example compressible foam.

The second lining piece 8 is for example peripheral to all the elements 3. The lining piece 8 is for example opposite the outside of the lateral surface 30 of those of the elements 3, which are the most in the outside, that is those of the elements 3 which are the closest and/or opposite walls 23, 24, 25, 26. The lining piece 8 is for example stuck by adhesive material against the outside of the surface lateral 30 of those of the elements 3, which are the more outside.

The second lining piece 8 extends along the second walls 23, 24, 25 and 26 and therefore comprises four faces, respectively 83, 84, 85, 86 located opposite the walls 23, 24, 25, 26.

Figure 8:
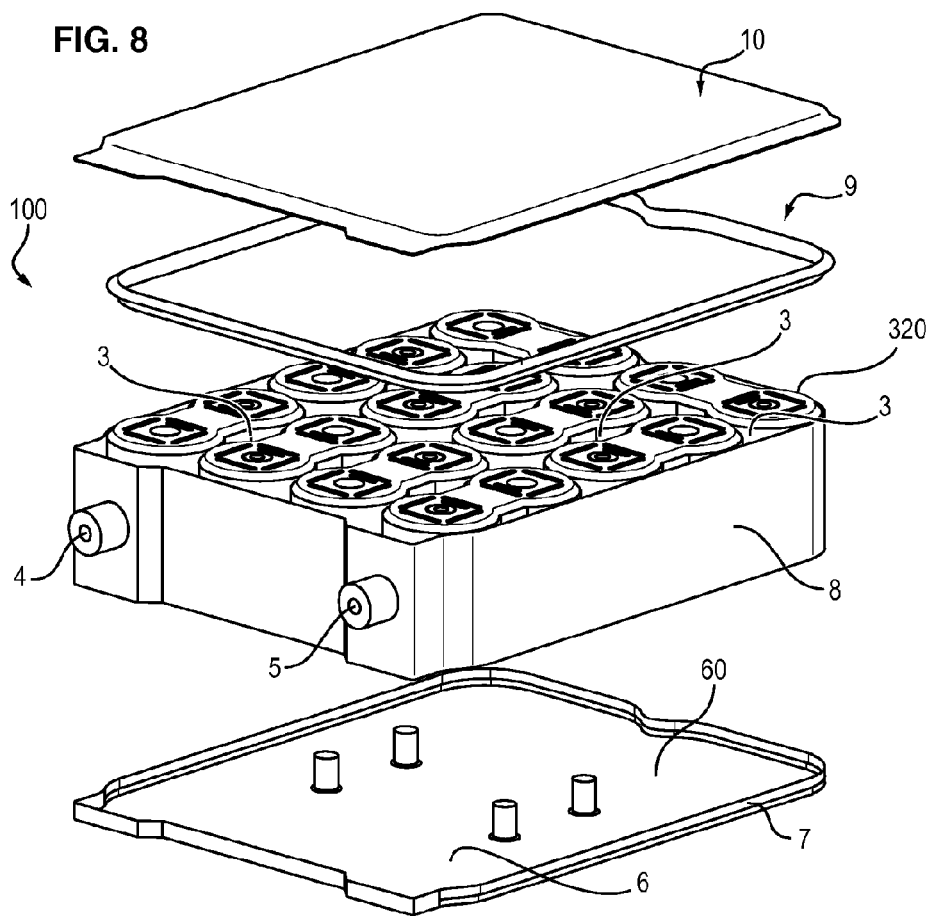
FIG. 8 is an exploded view in perspective of the inner parts of the module according to an embodiment of the invention.

In the embodiment shown in FIGS. 2 and 8, the second lining piece 8 is for example a monobloc band, peripheral to the elements 3, therefore with the faces 83, 84, 85, 86 joined together. The face 86 is for example in two separate halves 861 and 862, being covered by the two ends 863 and 864 of the band 8. Consequently, the recess 72 containing the edge 81 of the second lining piece 8 ensures double insulation because this edge 81 covers the part 73 of the rim 71, which are both made of electrically insulating material, as the same time as this lining piece 8 is kept in position, to ensure reliably continuity of the electrical insulation and to avoid gaps in the electrical insulation.

The insulating lining element 8 is preserved from crushing beyond its admissible limit in the recess 72 due to the configuration of the rim and especially the dimensions of the recess. It therefore retains all its electrical insulation properties. The recess 72 therefore offers a visual marker to the operator when he puts the lining element 8 in place.

Figure 5:
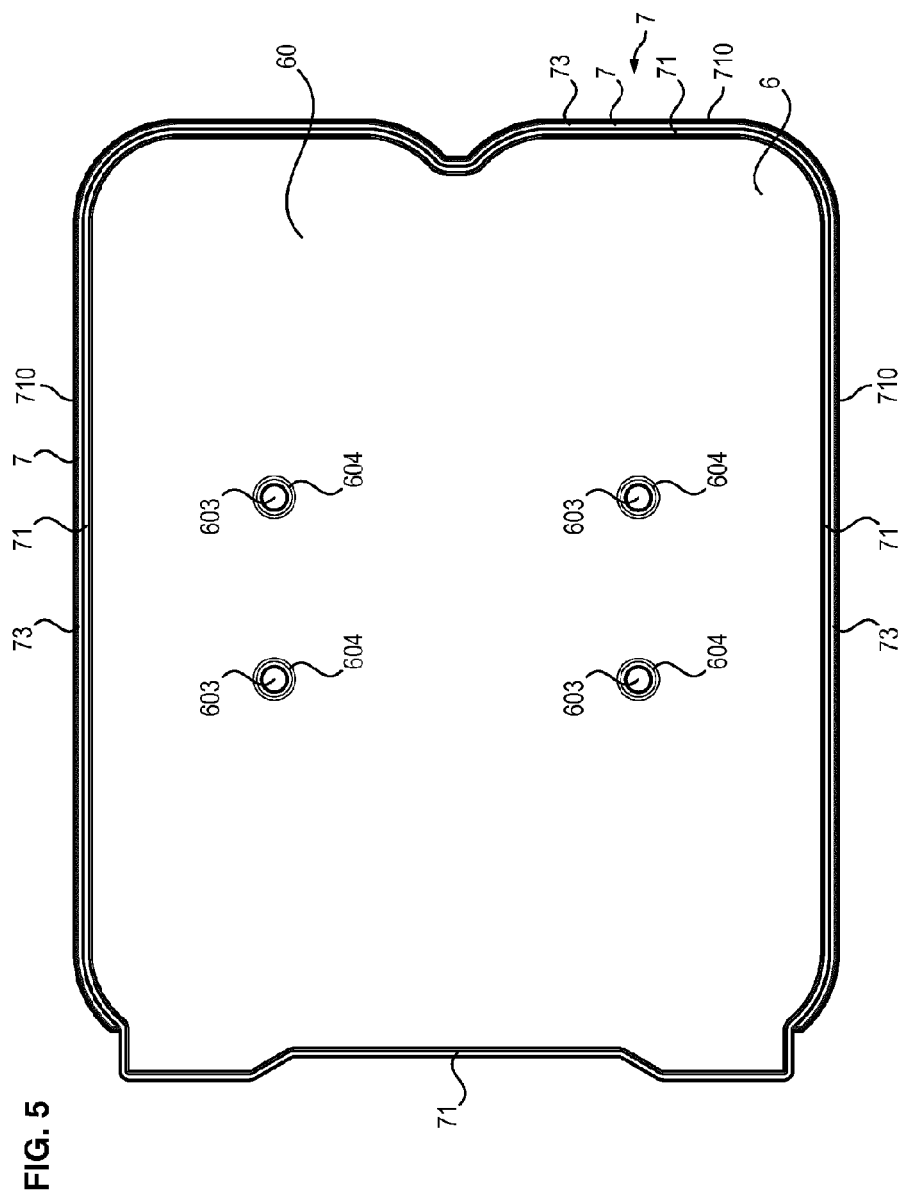
FIG. 5 is a schematic plan view of a base part present in the module according to an embodiment of the invention.

In the embodiment shown in FIG. 5, the first piece 60 has a flat surface 60 turned towards the elements 3.

Figure 6:
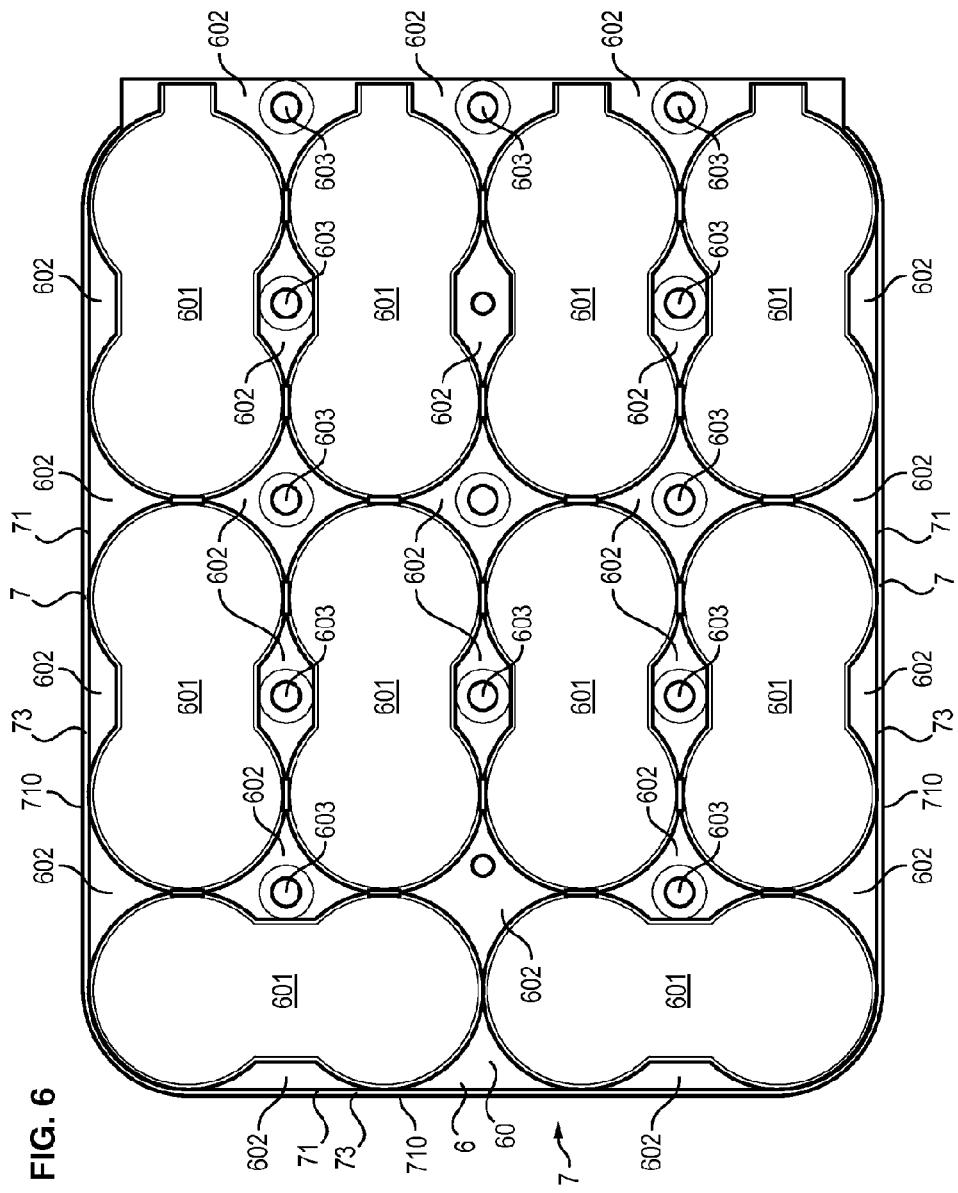
FIG. 6 is a schematic plan view of a base part present in the module according to another embodiment of the invention.

In the embodiment shown in FIG. 6, the first piece 60 comprises on its surface 60 turned towards the elements 3, hollows 601 for housing the first side 31 of the elements 3, these housing hollows 601 being separated by pins 602. The housing hollows 601 serve for example to border the side 31 of two juxtaposed elements 3, and/or the connection links 35 or some of the connection elements connecting the elements 3 together. This configuration enables separation of the elements and insulation of the elements (each being of different potential) relative to each other.

In the embodiments shown in FIGS. 2, 3, 4 and 8, a second positioning spacer 9 is also provided. This second positioning spacer 9 comprises the first support part 92 and the second part 91. This second spacer positioning 9 takes up space on the interface of the wall 22 and lateral walls 23-26. This spacer 9 forms a spacing ring 9, ensuring, just like the spacer 7, the link between the lining piece 8 and a third lining piece 10 stuck to the upper wall 22, for the sake of improvement of the electrical insulation of the module and holding of lining pieces.

The third lining piece 10 is arranged between the wall 22 and the second side 32 of the elements 3. This piece 10 is made of electrically insulating material, for example compressible synthetic material, and could be foam.

The ring 9 is mounted on the elements 3, by being peripheral to these elements 3. The ring 9 is therefore located in common against several of the elements 3, that is, against the elements 3 which are located most to the outside. The ring 9 passes in common on the outside of the second sides 32 of the elements 3 located most to the outside, that is, those close to the walls 23, 24, 25, 26. The ring 9 therefore surrounds several elements 3.

As is shown in FIGS. 3 and 4, the spacing ring 9 is located in common against said zone of said elements 3, this zone comprising the part of their proximal ridge 320 relative to the walls 23, 24, 25, 26. For even better holding of the elements 3 due to the spacing ring 9, the ring 9 comprises on one of its sides a lip 96 forming a V moving away from the wall of the case to follow the contour of the elements.

The spacing ring 9 comprises a first rim 91 and a second rim 92 adjacent to the first rim 91. The two rims 91 and 92 serve to support against two adjacent sides of the external elements 3 in said zone of the latter and against the walls respectively 22 and 23, 24, 25, 26 of the case. These two adjacent sides on the external elements 3 form a non-zero angle together. The adjacent rims 91 and 92 form also a non-zero angle between them, comparable to that present between the two adjacent sides of the elements (or around 90°). The rim 91 is a support rim against the end of the surface lateral 30 of the external elements 3, away from the first piece 60 and therefore close to the second side 32 and against the walls 23-26. It forms the second part of the second spacer 9. The rim 92 is a support rim on the sides 32 of the elements 3, away from the first piece 60, and against the wall 22. It forms the first part of the second spacer 9.

The spacing ring 9 has for example a frame form having rectilinear parts opposite the second walls.

The ring 9 comprises for example, as is shown in FIG. 3, on its first rim 91 turned towards the second walls 23, 24, 25, 26, a projection 94 extending parallel to the wall 22 in the direction of the wall 23 of the case. The projection 94 of the rim 91 has a thickness greater than the rest of the rim 91. This thickness is taken according to the direction normal to the second wall. The projection is placed on the face of the spacer turned towards the corresponding second wall 23, 24, 25, 26. This projection 94 is located at a distance from the free end 97 of the rim 91 such that the rim 91 has in the vicinity of the free end 97 a recess 93 serving to house another edge 87 of the second lining piece 8, which is that away from the first edge 81. The recess 93 is turned towards the second wall 23, 24, 25 and/or 26. A face 98 of the projection 94 essentially parallel to the wall 22 serves as positioning stop of the lining piece 8. Therefore, when the edge 87 is in the recess 93, this edge 87 is wedged between the second wall 23, 24, 25 and/or 26 and the free end 97 of the rim 91, ensuring a good fit in position of the piece 8 and at the same time ensuring continuity of the electrical insulation in this zone by avoiding electrical insulation gaps. The rim 92 could also comprise a projection and/or a recess such as described hereinabove to receive the lining piece 10.

It is evident that as a variant the lining piece 10 could be in a single piece with the spacer 9 forming the interface between the wall 22 and the lateral walls 23.

In the embodiments shown in FIGS. 5, 6, 7 and 9, the thermal dissipation piece 60 comprises one or more through-holes 603 for passage or one or more metallic parts 212 fixed to the first wall 21.

Figure 9:
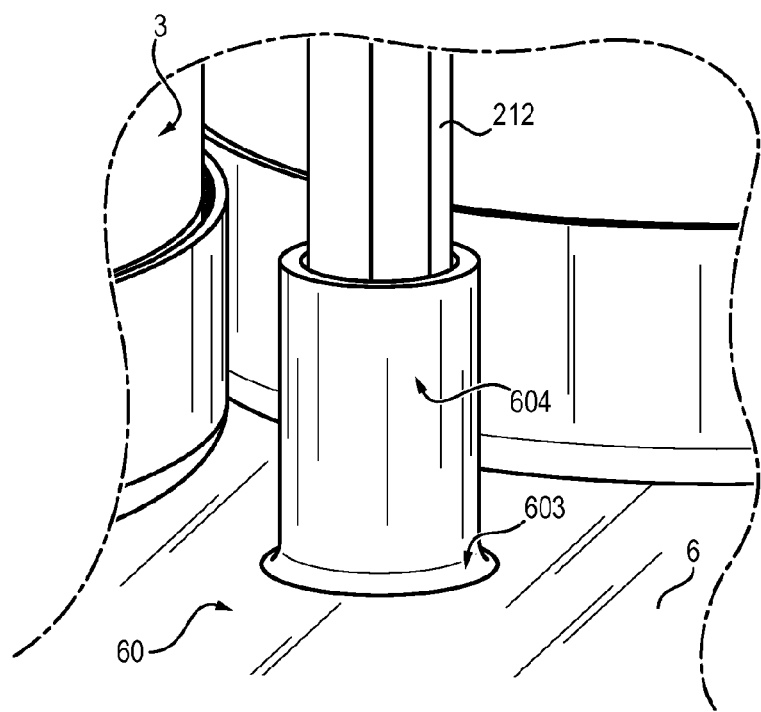
FIG. 9 is a schematic view in perspective of a part of the module according to an embodiment of the invention in the final assembly state of the module.
Figure 10:
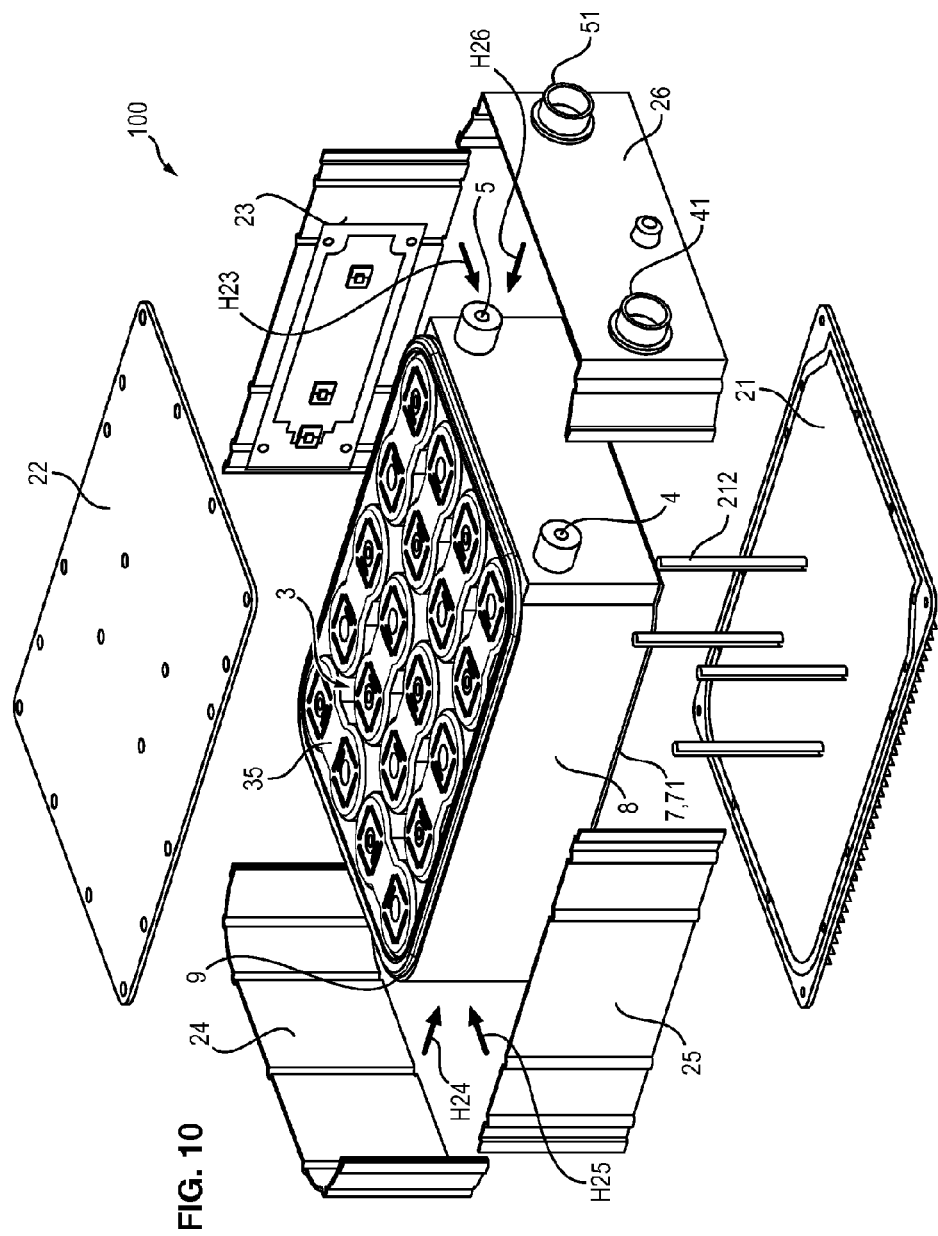
FIG. 10 is a schematic exploded view in perspective of the module according to the embodiment of the invention of FIG. 2.

In FIGS. 5 and 9, the hole 603 is for example extended towards the inside, that is, towards the elements 3, by a cylinder 604 fixed to the piece 60, specifically to the plaque 60, this cylinder or these cylinders 604 allowing passage of the parts 212 and increasing the leak line between the part 212 and the elements 3 by the height of this cylinder 604 on the piece 60, given that the cylinder 604 is made of electrically insulating material, while the part 212 is made of material conducting electricity. The parts 212 are for example metallic reinforcements by which the lower wall 21 is fixed to the upper wall 22, the case 2 and therefore this part 212 being for example earthed, the case 2 being therefore at a potential electrical different from at least one of the electrical terminals of the elements 3.

Figure 7:
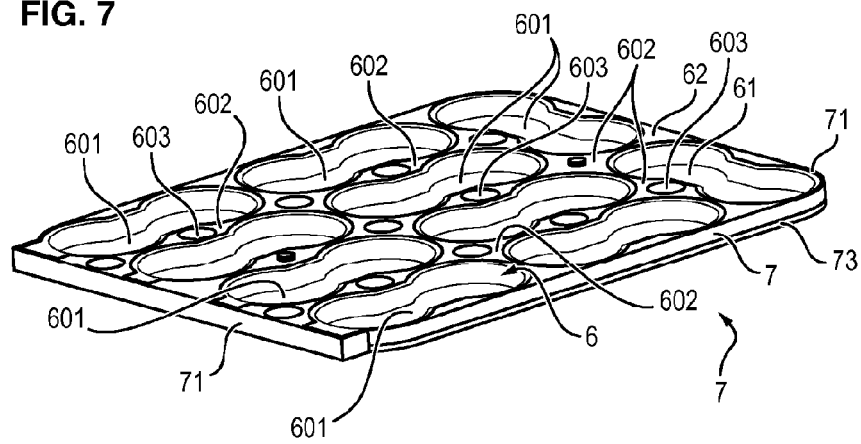
FIG. 7 is a schematic view in perspective of the base part according to FIG. 6.

In FIGS. 6 and 7, the holes 603 are provided in the parts in projection 602 of the piece 60, and are therefore at a greater height than the hollow 61 receiving the elements 3.

To assemble the module 1, the sub-set 100 intended to be enclosed by the case 2 is formed as follows.

The energy-storage elements 3 are first placed on the first piece 60 supported by a rigid support tool.

Next, the ring 9 is placed on the outer part of the external elements 3 to surround these elements 3.

The second lining piece 8 is placed around the external elements 3, by sticking this piece 8 onto the outside of the lateral surface 30 of the external elements 3 by means of adhesive. The edge 81 of the piece 8 is placed in the recess 72 of the lower rim 71 of the spacer 7, whereas the upper edge 87 of the piece 8 is placed in the upper recess 93 of the upper ring 9. This lining piece 8 has for example an adhesive side turned towards the elements 3. This adhesive piece 8 for example also keeps the cabling (connection means of the elements 3) in place in the module 1. The two ends 863 and 864 of the piece 8 are for example placed overlapping on each other by being for example placed in a corresponding part of the piece 60, or butt-ended.

The sub-set 100 thus pre-assembled comprises the piece 60, the spacer 7 fixed to the piece 60, the second lining piece 8 and the ring 9.

The second wall or second walls 23, 24, 25 and/or 26 are then applied against the positioning spacer 7 in the respective direction H23, H24, H25, H26 perpendicular to the rim 71 and going towards the lining piece 8, that is, in the horizontal directions H23, H24, H25, H26 in FIG. 2. These directions H23, H24, H25, H26 of application of the respective walls 23, 24, 25 and/or 26 are therefore for example substantially parallel to the piece 60 and to the first wall 21 and/or substantially perpendicular to the lateral surfaces 30 of the elements 3. The walls 23, 24, 25 and/or 26 are applied against the positioning spacer 7 and against the spacing ring 9 to arrive in the intermediate assembly position shown in FIGS. 1 and 3, so a to compress the edges 81 and 87 of the piece 8 in the recesses 72 and 93. In this intermediate assembly position, the first spacer 7 is against the second walls 23, 24, 25 and/or 26. In this assembly position, the ring 9 is against the second walls 23, 24, 25 and/or 26.

Then the lining piece 10 is put on the elements 3. The wall 22 comprises for example this lining piece 10 fixed below. The walls 22, 23, 24, 25 and 26 are then fixed to each other for example by screws. Then the sub-assembly topped by the walls 22, 23, 24, 25 and 26 fixed to each other is turned round. The case 2 is then closed by fixing from above the wall 21 to the walls 23, 24, 25 and 26, the mechanical reinforcement parts 212 being added through the holes 603, if necessary. The module 1 is finally in the final assembly state.

The method according to the invention is not just what has been described here: for example, as a variant, the spacer 7 could be arranged on the wall 21 before the elements 3 are placed on the latter. Other modifications are also feasible.

Because of the invention, assembling the module is easy in a reduced volume, resulting in a very short assembly cycle time for the module of electrical energy-storage elements 3. The reliability is also heightened relative to the electrical insulation function.

The invention claimed is:

1. A positioning spacer for positioning electrical energy-storage elements in an electrical energy storage module, the spacer comprising a first support part, and a second part forming a rim relative to the first support part, wherein the second part defines a free end having an interior surface and an exterior surface, and at least one housing recess in the exterior surface open toward the same direction that the free end extends, the spacer being made of electrically insulating material.

2. The spacer according to claim 1, wherein the spacer constitutes a closed spacing ring.

3. The spacer according to claim 1, wherein the first part is a substantially flat layer of material delimited by an outer contour, the outer contour being bordered at least partially by the second part.

4. The spacer according to claim 3, wherein the second part comprises several portions not connected to each other.

5. The spacer according to claim 1, wherein the second part is substantially perpendicular to the first part.

6. An energy-storage module, comprising an outer case having outer walls, comprising at least one first wall and at least one second wall adjacent to the first wall, the walls delimiting an inner space wherein are housed electrical energy-storage elements, wherein the module comprises at least one positioning spacer according to claim 1 for positioning at least some of the electrical energy-storage elements relative to the first wall and relative to the adjacent second wall, the first part of the spacer being intended to ensure positioning relative to the at least one first wall and the second part of the spacer being intended to ensure positioning relative to the at least one second wall.

7. The module according to claim 6, wherein the first part of the spacer is supported against the at least one first wall.

8. The module according to claim 6, wherein the second part of the spacer is supported against the at least one second wall.

9. The module according to claim 6, wherein the module comprises a first lining piece made of electrically insulating material, intended to at least partially cover the first wall of the module to be located between the first wall and the electrical energy-storage elements.

10. The module according to claim 9, wherein the first lining piece is a thermal dissipation and electrical insulation piece, made of thermally conductive material and extending substantially parallel to the first wall, to dissipate towards this first wall heat released by the electrical energy-storage elements.

11. The module according to claim 10, wherein the thermal and electrical insulation dissipation piece is constituted by the first part of the at least one spacer.

12. The module according to claim 10, wherein the first part of the spacer is supported against the first wall with interposition of the first lining piece.

13. The module according to claim 6, wherein the module comprises at least one second lining piece made of electrically insulating material, intended to cover at least partially the at least one second wall of the module to be located between said second wall and the electrical energy-storage elements, the recess of the at least one spacer serving to house an edge of the second lining piece.

14. The module according to claim 13, wherein the second lining piece is made of compressible material at least in its edge housed in the recess to ensure holding of the lining piece relative to the spacer.

15. The module according to claim 13, wherein the at least one second lining piece is constituted by a band wound around all the electrical energy-storage elements and fixed to these electrical energy-storage elements.

16. The module according to claim 6, wherein the spacer constitutes a closed spacing ring, the ring forming this spacer being dimensioned to surround a plurality of juxtaposed electrical energy-storage elements.

17. The module according to claim 16, wherein the ring comprises, at the interface between two determined adjacent elements, at least one lip configured to locally move away the spacer relative to the second wall and follow the contour of the two determined adjacent elements.

18. The module according to claim 6, wherein the outer case has the general form of a parallelepiped, comprising two first faces constituting the faces of largest area of the case, adjacent to four other faces of the parallelepiped, designated second faces, there is provided as spacer at least one first spacer, whereof the first part is supported against one of the two first faces forming the first wall and whereof the second part is supported against at least one of the second faces forming the at least one second wall.

19. The module according to claim 18, wherein it is provided as spacer at least one second spacer, whereof the first part is supported against the other first face forming another first wall of the case and whereof the second part is supported against at least one of the second faces forming the at least one second wall.

20. The module according to claim 19, wherein the module comprises:
the sole first spacer whereof the first part is constituted by a first lining piece made of electrically insulating material, intended to cover at least partially the first wall of the module to be located between the first wall and the electrical energy-storage elements, the first lining piece being a thermal dissipation and electrical insulation piece, made of thermally conductive material and extending substantially parallel to the first wall, to dissipate towards this first wall heat released by the electrical energy-storage elements,
and
the sole second spacer, forming a spacing ring.

21. A method of assembly of the module according to claim 6, comprising the following steps:
a set comprising the electrical energy-storage elements and the at least one spacer is formed such that the first part of each spacer is placed on or under the elements and the second part of the spacer extends laterally outside the set according to a plane comprising a parallel to the longitudinal direction of the storage elements,
the set is surrounded by a lining band constituting a second lining piece such that the edge of the band is placed in the recess of the second part of the spacer, and the band is fixed to the elements,
at least the second walls of the case are assembled on the elements such that the walls are in contact with the lining band.

22. A positioning spacer kit comprising:
the positioning spacer according to claim 1, and
at least one lining piece made of electrically insulating material having an edge disposed at least partially within the at least one housing recess.

* * * * *